Oct. 10, 1950 — C. H. BISSELL — 2,525,582
OUTLET BOX FIXTURE HANGER
Filed Aug. 29, 1945

INVENTOR.
Carl H. Bissell
BY Boodell & Thompson
ATTORNEYS.

Patented Oct. 10, 1950

2,525,582

UNITED STATES PATENT OFFICE 2,525,582

OUTLET BOX FIXTURE HANGER

Carl H. Bissell, Syracuse, N. Y., assignor to Crouse-Hinds Company, Syracuse, N. Y., a corporation of New York Application August 29, 1945, Serial No. 613,322

3 Claims. (Cl. 248—342)

This invention relates to a hanger for suspending a lighting fixture from a conduit outlet box arranged in an electrical conduit run.

More particularly, the invention relates to a hanger device intended particularly for suspending lighting fixtures of appreciable length, such as those employing fluorescent tubes.

The invention has an object a hanger for suspending lighting fixtures of the type referred to which embodies a particularly economical structure which is readily attached to the conduit outlet box and provided with means whereby the fixture may be quickly and conveniently positioned, either parallel, or at right angles, to the conduit run, and will be maintained in the position selected.

The invention consists in the novel features and in the combinations and constructions hereinafter set forth and claimed.

In describing this invention, reference is had to the accompanying drawings in which like characters designate corresponding parts in all the views.

Figure 1:
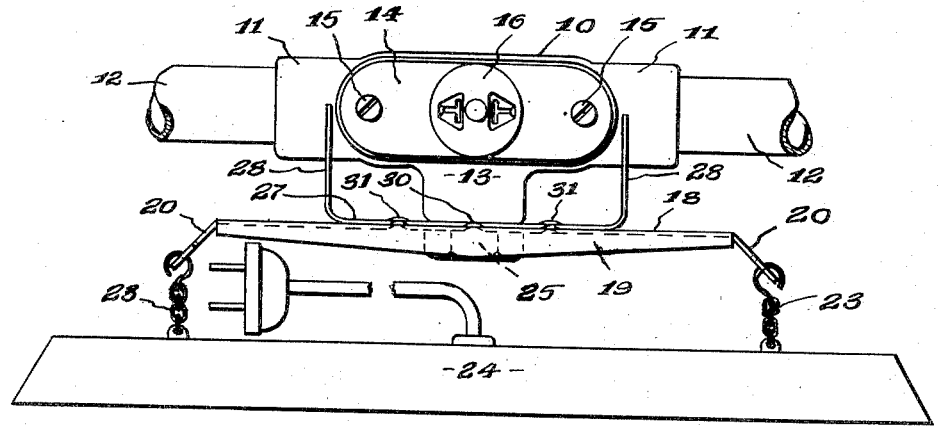
Figure 1 is a side elevational view of a hanger embodying my invention illustrating the same suspending a lighting fixture from a conduit outlet box.
Figure 2:
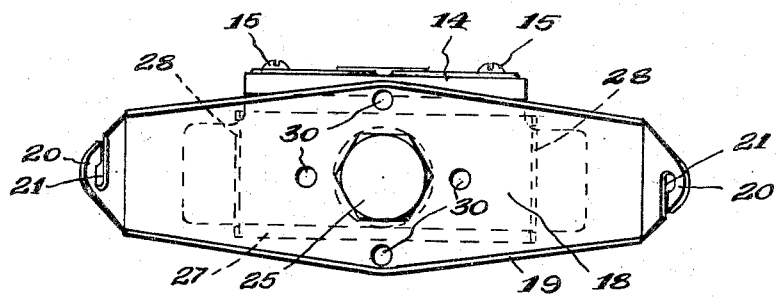
Figure 2 is a bottom plan view of the hanger structure shown in Figure 1.
Figure 3:
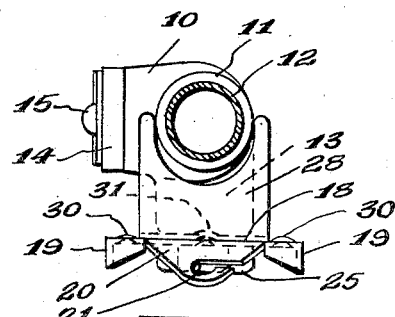
Figure 3 is an end elevational view of the structure shown in Figures 1 and 2.

The conduit outlet box 10 is of the conventional T formation having aligned internally threaded hubs 11 to receive the conduit run 12, and a similar internally threaded lateral hub 13. The box is provided with a side opening closed by a plate 14 detachably secured to the box, as by screws 15, and which carries a plug receptacle 16.

The fixture hanger comprises a suspension plate 18 formed with depending side flanges 19 and depending end portions 20 formed with slotted apertures 21 to receive flexible suspension members, as chains 23, for supporting the fixture 24. The plate 18 is of elongated structure, or formed with laterally extending arm portions to provide sufficient space between the end portions 20. The plate 18 is provided with a centrally located aperture to receive a fastening member such as the cap screw 25 formed to thread into the lateral hub 13 of the box.

An aligner plate 27 is interposed between the suspension plate 18 and the box, or the hub 13 thereof, and is provided with means cooperable with the box to maintain the plate 27 in a predetermined fixed relationship to the box. As shown, the plate 27 is formed with upwardly extending end portions 28, the free ends of which are bifurcated or provided with a notch of sufficient dimension to receive the hub portions 11 of the box, the plate 27 being likewise formed with an aperture to receive the fastening screw 25, whereby the two plates may be secured or clamped against the box.

As previously stated, the hanger is intended particularly for the suspension of lighting fixtures employing fluorescent tubes. These fixtures are necessarily of appreciable length and in large rooms, particularly industrial concerns, a plurality of these lamps are used in a room, and it is essential that the lighting units be positioned and maintained in some predetermined relation. Such an installation usually consists of parallel rows of fixtures suspending from the ceiling of a room.

The invention includes means whereby the fixtures can be quickly positioned parallel, or at right angles, to the conduit run and maintained in the position selected. This is accomplished by means cooperable with the suspension plate and the aligner plate for detachably interlocking the plates when the same are clamped to the outlet box by the fastening member. As here shown, the suspension plate is formed with a plurality, in this instance, four raised projections 30 on the upper surface of the plate, and the aligner plate 27 is formed with complemental recesses 31, the projections 30 and the recesses 31 being spaced equal distances from the center of the plates, or the fastening member 25, and being so positioned that the suspension plate may be arranged parallel to the conduit run, as shown in the drawings, or at right angles thereto, the plate being rotatable about the fastening member 25 when the same is loosened, or slightly backed out of the hub 13. When the member 25 is tightened, the plates are clamped against the outlet box with the projections 30 seated in the recesses 31, whereby the plates 18, 27, are interlocked and the suspension plate and the fixture 24 carried thereby prevented from moving out of the selected predetermined angular relation to the box.

What I claim is:

1. A hanger for suspending a lighting fixture from a conduit outlet box comprising a suspension plate formed with an aperture and having arm portions extending radially therefrom, and an aligner plate interposed between said suspension plate and the outlet box, said aligner plate being formed with an aperture and a fastening member extending through the apertures of said plates and being cooperable with said plates and the box to detachably clamp the plates to the box, said aligner plate having means cooperable with said box to maintain the plate in a predetermined fixed relation to the box, and means cooperable with said plates to interlock the suspension plate to the aligner plate when said plates are clamped against the box.

2. A hanger for suspending a lighting fixture from a conduit outlet box comprising a suspension plate formed with outwardly extending arm portions and an aligner plate interposed between the suspension plate and the box, a screw member extending through said plates and being cooperable with the box to clamp the plates thereagainst, said aligner plate having end portions extending into engagement with said box and being operable to prevent rotation of said plate about said screw member, and said plates being formed on their abutting surfaces with means cooperable to interlock said plates when said screw member is tightened.

3. A hanger for suspending a lighting fixture from a conduit outlet box comprising a fixture suspension plate formed with a pair of arms extending radially from the outlet box, an aligner plate interposed between the suspension plate and the box and being formed with upwardly extending notched end portions engaging the box and retaining the aligner plate from rotation relative to the box, a screw member extending through said plates and being cooperable with the box to clamp the plates thereagainst, one of said plates being formed with projections interlocking with the other plate when the plates are clamped against the box to restrain rotation of the suspension plate about said screw.

CARL H. BISSELL.

REFERENCES CITED

The following references are of record in the file of this patent:

UNITED STATES PATENTS

| Number | Name | Date |
|---|---|---|
| 1,617,184 | Spott | Feb. 8, 1927 |
| 1,782,791 | Nielsen | Nov. 25, 1930 |
| 2,249,331 | Sachs | July 15, 1941 |